(12) United States Patent
Oakuyama et al.

(10) Patent No.: US 7,008,059 B2
(45) Date of Patent: Mar. 7, 2006

(54) COLOR COMBINING OPTICAL SYSTEM AND IMAGE PROJECTION APPARATUS

(75) Inventors: Atsushi Oakuyama, Kanagawa (JP); Mitsuharu Sawamura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 10/771,860

(22) Filed: Feb. 3, 2004

(65) Prior Publication Data
US 2004/0156022 A1   Aug. 12, 2004

(30) Foreign Application Priority Data
Feb. 3, 2003   (JP) ............................ 2003-025473

(51) Int. Cl.
*G03B 21/14* (2006.01)
(52) U.S. Cl. ............................... 353/20; 353/31; 349/9
(58) Field of Classification Search ................. 353/20, 353/31, 33, 34, 37, 81; 349/5, 7, 8, 9; 359/634, 359/638
See application file for complete search history.

(56) References Cited

U.S. PATENT DOCUMENTS

| | | | | |
|---|---|---|---|---|
| 5,453,859 | A | * | 9/1995 | Sannohe et al. ................ 349/9 |
| 5,579,138 | A | * | 11/1996 | Sannohe et al. .............. 349/96 |
| 5,625,491 | A | * | 4/1997 | von Gunten et al. ....... 359/487 |
| 5,967,635 | A | | 10/1999 | Tani et al. |
| 5,982,541 | A | * | 11/1999 | Li et al. ..................... 359/497 |
| 6,183,091 | B1 | | 2/2001 | Johnson et al. |
| 6,327,093 | B1 | * | 12/2001 | Nakanishi et al. .......... 359/634 |
| 6,343,864 | B1 | * | 2/2002 | Tajiri ............................ 353/20 |
| 6,432,854 | B1 | | 8/2002 | Ueda et al. |
| 6,447,120 | B1 | * | 9/2002 | Hansen et al. ................ 353/20 |
| 6,462,873 | B1 | * | 10/2002 | Kwok et al. ................ 359/487 |
| 6,648,474 | B1 | * | 11/2003 | Katsumata et al. ........... 353/20 |
| 6,678,015 | B1 | * | 1/2004 | Yi et al. ...................... 348/782 |
| 6,789,902 | B1 | * | 9/2004 | Hayashi et al. ............... 353/20 |

FOREIGN PATENT DOCUMENTS

JP   2001-154268   6/2001

OTHER PUBLICATIONS

Li Li, et al.; "Novel Thin Film Polarizing Beam-splitter and Its Application in High Efficiency Projection Displays", *SPIE Conference on Projection Displays;* vol. 3634, Jan. 1999, pp. 52-62.

* cited by examiner

*Primary Examiner*—William C. Dowling
(74) *Attorney, Agent, or Firm*—Morgan & Finnegan, LLP

(57) ABSTRACT

A color combining optical system is disclosed, with which light of a plurality of colors can be combined while reducing the loss of light due to fluctuations in the incidence angle on a polarization color combining film. The color combining optical system, which combines a first color light and a second color light, includes a polarization color combining film made of a multilayer film. The polarization color combining film combines a first polarization component of the first color light and a second polarization component of the second color light, which has a polarization direction substantially perpendicular to the first polarization component, with an efficiency of 90% or more in a predetermined incidence angle range.

10 Claims, 15 Drawing Sheets

P—POLARIZED LIGHT

S—POLARIZED LIGHT

COLOR COMBINING OPTICAL SYSTEM AND IMAGE PROJECTION APPARATUS

BACKGROUND OF THE INVENTION

1. Field of the Invention

The present invention relates to color combining optical systems used for image projection apparatuses such as projectors.

2. Description of Related Art

An image projection apparatus combining reflective liquid crystal display elements and polarization beam splitters is disclosed in Japanese Patent Application Laid-Open No 2001-154268.

As shown in FIG. 12, the image projection apparatus disclosed in this publication includes a white light source 1001, reflective liquid crystal display elements 1002R, 1002G and 1002B, and a projection optical system 1003, as well as a dichroic mirror 1004 arranged between the white light source 1001 and the reflective liquid crystal display elements 1002R, 1002G and 1002B. The image projection apparatus further includes a color separating system provided with polarization beam splitters 1005 and 1006 between the dichroic mirror 1004 and the reflective liquid crystal display elements 1002R, 1002G and 1002B, as well as a color combining system provided with the first and second and a third polarization beam splitter 1005, 1006 and 1007 between the reflective liquid crystal display elements 1002R, 1002G and 1002B and the projection optical system 1003.

Here, the color separating system separates the white light with the dichroic mirror 1004 into light of a first color (green) and light of a second and third color (red and blue). The light of the first color is incident on a first polarization beam splitter 1005. The light of the second and third colors is incident on a first color-selective wave plate 1008 provided between the dichroic mirror 1004 and the second polarization beam splitter 1006. The first color-selective wave plate 1008 can rotate the polarization direction of the light of a predetermined wavelength region by 90°. Thus it is possible to correlate the color components (R and B) with the polarization directions (P and S).

The first color-selective wave plate 1008 rotates the polarization direction of the B light by 90°, the B light is incident as P-polarized light and the R light is incident as S-polarized light on the second polarization beam splitter 1006, and the light of the second color (R) is separated from the light of the third color (B) by this second polarization beam splitter 1006.

In the color combining system, the polarization direction of the G light reflected by the first polarization beam splitter 1005 is rotated 90° by the first reflective liquid crystal display element 1002G, the G light is transmitted through the first polarization beam splitter 1005, its polarization direction is again rotated 90° by a ½ wave plate 1012, is reflected by the third polarization beam splitter 1007, and reaches the projection optical system 1003.

Moreover, the polarization direction of the R light is rotated 90° and the R light is reflected by the second reflective liquid crystal display element 1002R, and is transmitted through the second polarization beam splitter 1006. The polarization direction of the B light is rotated 90° and the B light is reflected by the third reflective liquid crystal display element 1002B, and is reflected by the second polarization beam splitter 1006. Thus, the light of the two colors red and blue is combined into one light flux.

Here, the polarization direction of the B light is rotated 90° by a second color-selective wave plate 1009 arranged between the second polarization beam splitter 1006 and the third polarization beam splitter 1007, so that the B light becomes P-polarized light, like the R light. Therefore, as the R and B light is transmitted through the third polarization beam splitter 1007, the light of the three colors is combined and reaches the projection optical system 1003.

However, in the color combining system of the image projection apparatus in this conventional example, polarization beam splitters are used to combine the light of the first color, the light of the second color and the light of the third color, so that there is the problem of a loss of light and a mismatching of the color balance when the transmittance for P-polarized light decreases due to the incidence angle characteristics of the polarization splitting surfaces (films) provided on the polarization beam splitters.

FIG. 13 shows a graph of the transmittance of the polarization splitting surface for P-polarized light. The polarization splitting surface achieves a transmittance that is close to 100% when the P-polarized light that is transmitted through the polarization splitting surface satisfies the Brewster angle, so that when the incidence angle fluctuates, the incidence angle at the polarization splitting surface will deviate from the Brewster angle. Thus, the transmittance is lowered considerably, so that there is the problem that an angular fluctuation as shown in FIG. 13 occurs.

Furthermore, there are also conventional examples, in which a dichroic prism is used instead of a polarization beam splitter 1007. However in this case, the half-value wavelength separating the wavelengths into transmitted and reflected wavelengths shifts due to the incidence angle characteristics, so that the spectral characteristics tend to change. Thus, there is the problem of a loss of light and a mismatching of the color balance.

FIG. 14 illustrates the transmittance of a dichroic film. The dichroic film is made by arranging layers of different refractive index in an alternating manner. Dichroic characteristics by which a predetermined wavelength region is transmitted while other wavelength regions are reflected are attained by alternatingly forming a transmitting (wavelength) band in which light is transmitted and a reflecting (wavelength) band in which light is reflected, with the same equivalent refractive index.

In this case, the following relation is established between the central wavelength λ0 of the reflection band and the refractive index n and the film thickness d of the film material formed in alternating layers, as shown in FIG. 15, and the light ray angle θ with respect to the refraction surface:

$$\lambda 0 = 4 \times n1 \times d1 \times \cos(\theta 1) = 4 \times n2 \times d2 \times \cos(\theta 2)$$

Here, n1×d1×cos(θ1) and n2×d2×cos(θ2) are the equivalent film thicknesses.

From this relation, it can be seen that when the incidence angle of the light on the dichroic film changes and the light ray angle θ on the refraction surface changes, then the center wavelength of the refractive band changes too, so that the dichroic characteristics shift in the wavelength direction, and angular fluctuations as shown in FIG. 14 are the result.

SUMMARY OF THE INVENTION

It is an object of the present invention to provide a color combining optical system with which light of a plurality of colors can be combined while reducing the loss of light due to fluctuations in the incidence angle on the polarization color combining film, and with which a bright image can be achieved, as well as an image projection apparatus including such a color combining optical system.

In order to achieve this object, a color combining optical system according to one aspect of the present invention, which combines a first color light and a second color light, includes a polarization color combining film made of a multilayer film. The polarization color combining film combines a first polarization component of the first color light and a second polarization component of the second color light, which has a polarization direction substantially perpendicular to the first polarization component, with an efficiency of 90% or more in a predetermined incidence angle range.

These and further objects and features of the color combining optical system and the image projection apparatus according to the present invention will become apparent from the following detailed description of preferred embodiments thereof taken in conjunction with the accompanying drawings.

DETAILED DESCRIPTION OF THE PREFERRED EMBODIMENTS

The following is a description of preferred embodiments of the present invention, with reference to the accompanying drawings.

Embodiment 1

Figure 1:
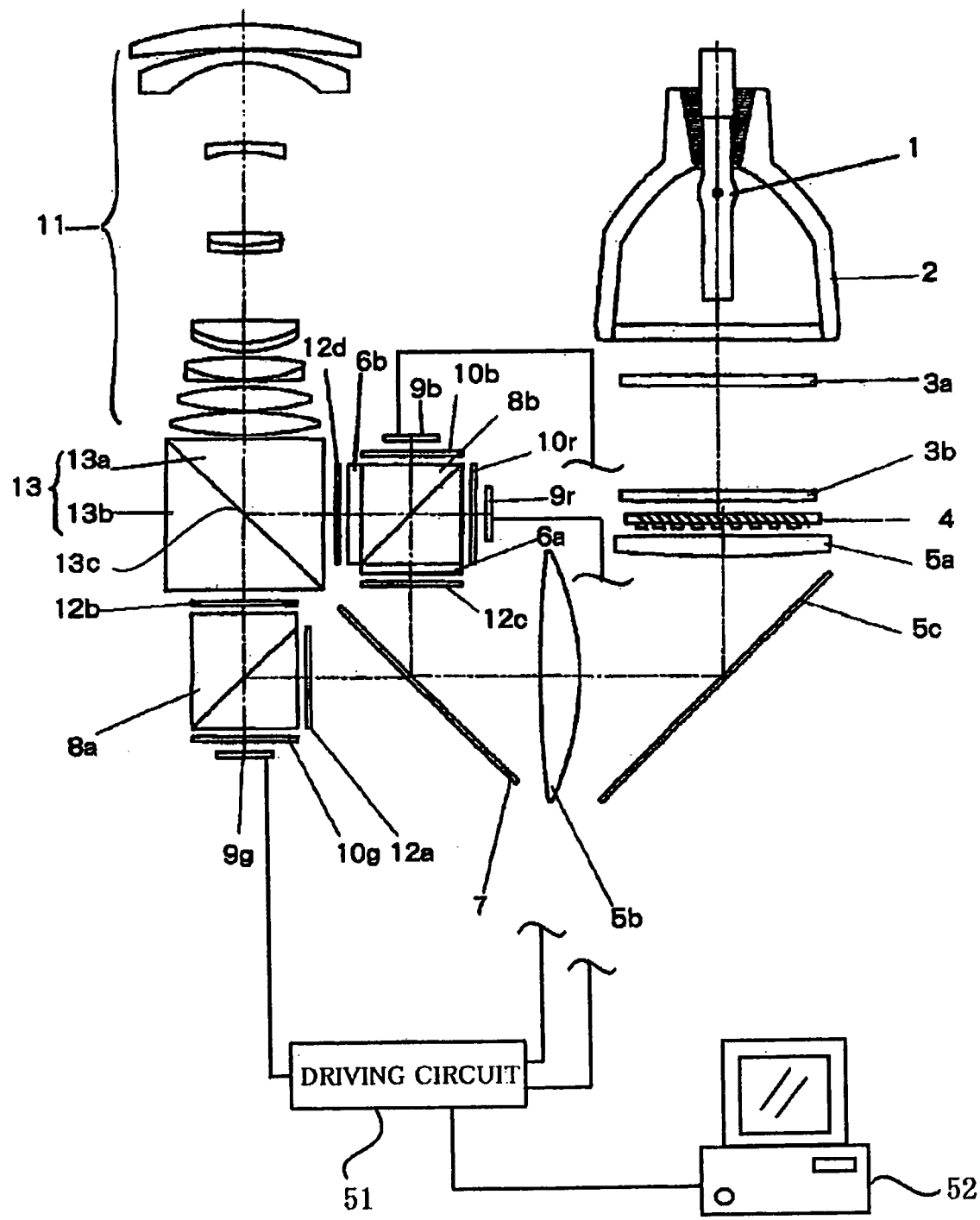
FIG. 1 shows an example of the structure of an image projection apparatus according to Embodiment 1 of the present invention.

FIG. 1 shows an example of the structure of an image projection apparatus according to Embodiment 1 of the present invention. In FIG. 1, reference numeral 1 denotes a light source emitting white light with a continuous spectrum, reference numeral 2 denotes a reflector condensing light in a predetermined direction, reference numeral 3a denotes a first fly-eye lens made by arranging rectangular lenses in a matrix, and reference numeral 3b denotes a second fly-eye lens made of a lens array corresponding to the individual lenses in the first fly-eye lens 3a.

Reference numeral 4 denotes a polarization conversion element, which aligns unpolarized light to light which has a predetermined polarization direction. Reference numerals 5a and 5b denote condenser lenses, and reference numeral 5c denotes a reflection mirror. Reference numeral 6a denotes a first color-selective wave plate, which converts the polarization direction of blue light (also referred to as "B light" in the following) by 90° but does not convert the polarization direction of red light (also referred to as "R light" in the following). Reference numeral 6b denotes a second color-selective wave plate, which converts the polarization direction of R light by 90° but does not convert the polarization direction of B light. It should be noted that green light is also referred to as "G light" in the following.

Reference numeral 7 denotes a dichroic mirror, which reflects light of the R wavelength region and transmits light of the G wavelength region. Reference numerals 8a and 8b denote a first polarization beam splitter and a second polarization beam splitter, which have a polarization splitting surface that transmits P-polarized light and reflects S-polarized light. Reference numeral 13 denotes a polarization color combining prism, which transmits P-polarized G light and reflects S-polarized R and B light.

Reference numerals 9r, 9g and 9b respectively denote a reflective liquid crystal display element (image-forming element) for red, a reflective liquid crystal display element for green, and a reflective liquid crystal display element for blue, which reflect the respective color light (incident light) and perform image modulation.

These liquid crystal display elements 9r, 9g and 9b are connected to a driving circuit 51. The driving circuit 51 is supplied with image signals from an image information supplying apparatus 52, such as a personal computer, a DVD player, a video deck or a television receiver, and drives the liquid crystal display elements 9r, 9g and 9b in response to the supplied image signals. Thus, the light of the respective colors incident on the liquid crystal display elements 9r, 9g and 9b is image-modulated and reflected.

Reference numerals 10r, 10g and 10b respectively denote a ¼ wave plate for red, a ¼ wave plate for green, and a ¼ wave plate for blue. Reference numeral 11 denotes a projection lens, and reference numerals 12a, 12b, 12c and 12d respectively denote polarizing plates.

The following is a description of the optical action. The light emitted from the light source 1 is condensed in a predetermined direction by the reflector 2. Here, the reflector 2 has a parabolic shape, and the light from the focus position of the paraboloid is turned into a light flux that is parallel to the symmetry axis of the paraboloid. However, since the light source 1 is not an ideal point light source but has a finite size, the condensed light flux includes many components of light that is not parallel to the symmetry axis of the paraboloid.

The condensed light flux is incident on the first fly-eye lens 3a. The first fly-eye lens 3a is made of rectangular lenses with positive refractive power that are combined to a matrix, and the incident light flux is divided into a plurality of light fluxes corresponding to those lenses, and these light fluxes are condensed. Then, these divided light fluxes are transmitted through a second fly-eye lens 3b, and form, in matrix shape, a plurality of light-source images in the vicinity of the polarization conversion element 4.

The polarization conversion element 4 is made of polarization splitting surfaces, reflecting surfaces and ½ wave plates. The plurality of light fluxes condensed into matrix shape is incident on the polarization splitting surface corresponding to the rows of the light fluxes and is divided into P-polarized light components which are transmitted and S-polarized light components which are reflected.

The reflected S-polarized light components are reflected by the reflecting surface and emerge in the same direction as the P-polarized light components. The P-polarized light components are transmitted through the ½ wave plates and are converted into components with the same polarization as the S-polarized components. Thus, light fluxes with aligned polarization direction emerge from the polarization conversion element 4.

The light fluxes whose polarization has been converted are focused to the vicinity the polarization conversion element 4 and then reaches a condensing optical system as divergent light fluxes.

The condensing optical system is made of condenser lenses 5a and 5b. The light fluxes overlap with each other at a position where the rectangular images of the fly-eye lens are formed by the condensing optical system, and form rectangular uniform illumination areas. The reflective liquid crystal display elements 9r, 9g and 9b are arranged in these illumination areas.

Figure 2:
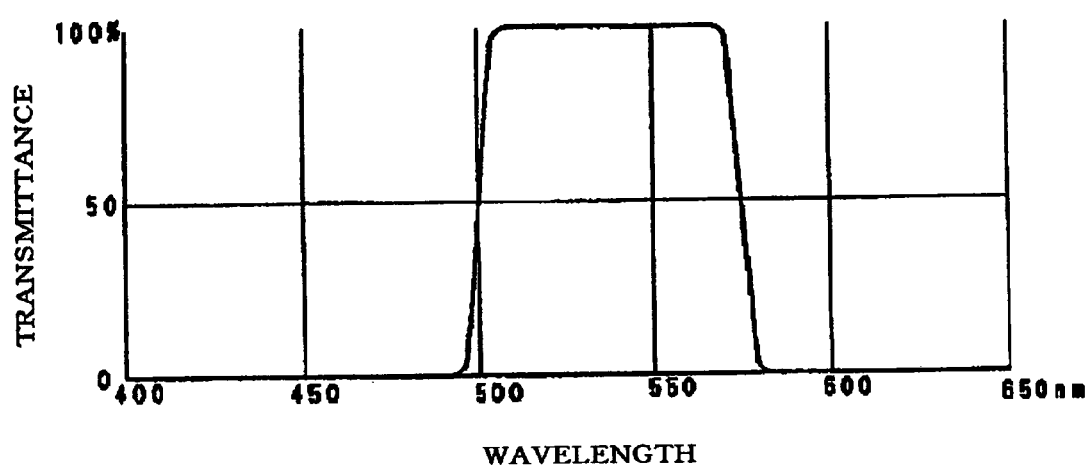
FIG. 2 is a graph illustrating the characteristics of a dichroic mirror of Embodiment 1.

The dichroic mirror 7, which is provided in the illumination optical path, has the characteristics shown by the solid line in FIG. 2.

After the disturbance, due to the dichroic mirror 7, of the polarization direction of the G light that has been separated by the dichroic mirror 7 is rectified by a polarizing plate 12a, the G light is incident as S-polarized light on the first polarization beam splitter 8a, reflected by its polarization splitting surface (film) and reaches the reflective liquid crystal display element 9g for G light.

At the reflective liquid crystal display element 9g for G light, the G light is image-modulated and reflected. The S-polarized light component of the image-modulated G light is reflected again by the polarization splitting surface (film) of the first polarization beam splitter 8a and is returned to the light source side and thus eliminated from the projection light. The P-polarized light component of the image-modulated G light is transmitted through the polarization splitting surface of the first polarization beam splitter 8a and becomes the projection light. After unnecessary polarization components are further eliminated with the polarizing plate 12b, the light that has been transmitted through the first polarization beam splitter 8a reaches the polarization color combining prism 13.

After the disturbance, due to the dichroic mirror 7, of the polarization direction of the R light and the B light reflected by the dichroic mirror 7 is rectified by the polarizing plate 12c, the R light and the B light are incident on the first color-selective wave plate 6a. The characteristics of the first color-selective wave plate 6a are shown in FIG. 3.

Figure 3:
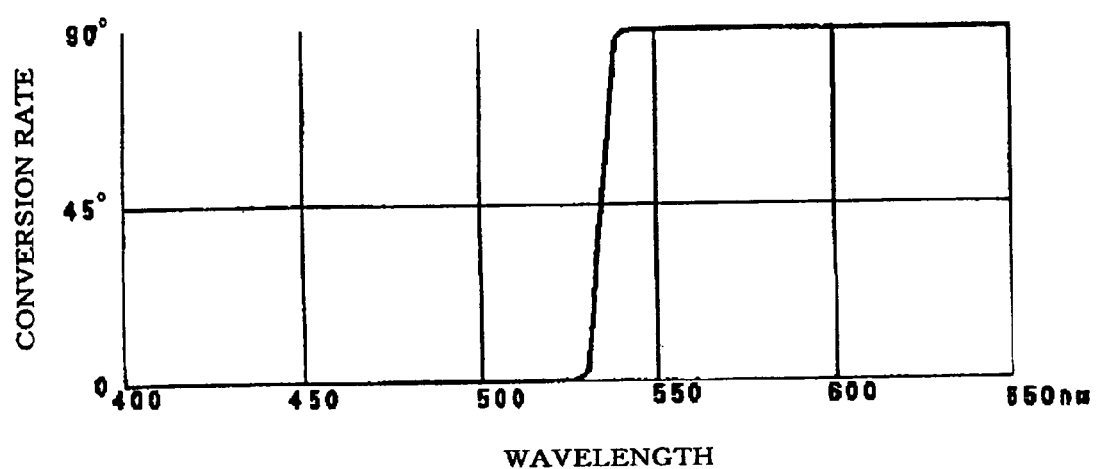
FIG. 3 is a graph illustrating the characteristics of a color-selective wave plate of Embodiment 1.

In FIG. 3, the horizontal axis marks the wavelength of incident light, and the vertical axis marks the conversion rate at which the polarization direction is converted to a direction 90° (perpendicular) to the polarization direction of the incident light. Thus, R light emerges as S-polarized light without being converted from the first color-selective wave plate 6a, whereas B light is converted and emerges as P-polarized light from the first color-selective wave plate 6a.

Thus, the B light is incident as P-polarized light and the R light is incident as S-polarized light on the second polarization beam splitter 8b. At the second polarization beam splitter 8b, the B light is transmitted through the polarization splitting surface and reaches the reflective liquid crystal display element 9b for B light, whereas the R light is reflected by the polarization splitting surface and reaches the reflective liquid crystal display element 9r for R light.

At the reflective liquid crystal display element 9b for B light, the B light is image-modulated and reflected. The P-polarized component of the modulated B light is again transmitted through the polarization splitting surface of the second polarization beam splitter 8b, and is returned to the light source side and thus eliminated from the projection light. The S-polarized component of the modulated B light is reflected by the polarization splitting surface of the second polarization beam splitter 8b and reaches the polarization color combining prism 13.

Similarly, at the reflective liquid crystal display element 9r for R light, the R light is image-modulated and reflected. The S-polarized component of the modulated R light is again reflected by the polarization splitting surface of the second polarization beam splitter 8b, and is returned to the light source side and thus eliminated from the projection light. The P-polarized component of the modulated R light is transmitted through the polarization splitting surface of the second polarization beam splitter 8b and reaches the polarization color combining prism 13. Thus, the B projection light and the R projection light are combined into one light flux.

Figure 4:
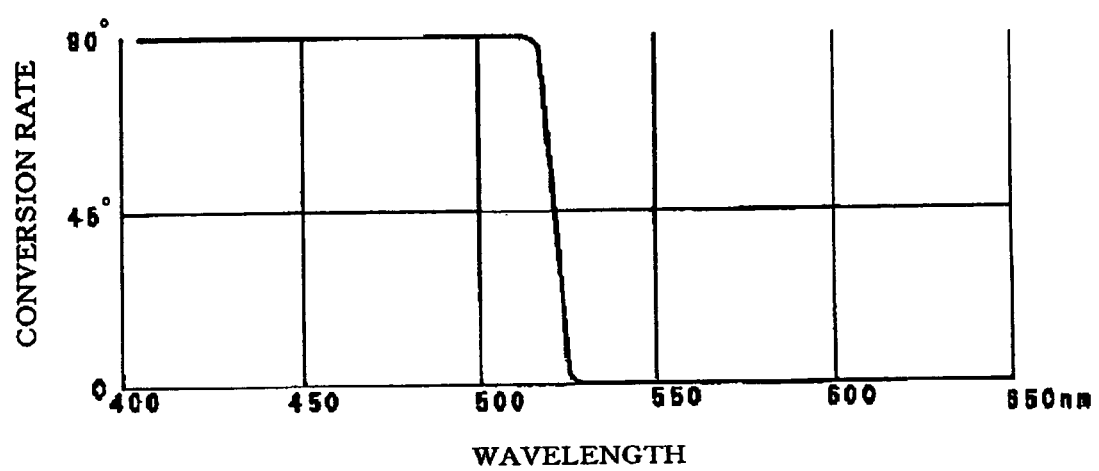
FIG. 4 is a graph illustrating the characteristics of a color-selective wave plate of Embodiment 1.

The combined R light and B light is incident on the second color-selective wave plate 6b. The second color-selective wave plate 6b has the characteristics shown in FIG. 4. In FIG. 4, the horizontal axis marks the wavelength of incident light, and the vertical axis marks the conversion rate at which the polarization direction is converted to a direction 90° (perpendicular) to the polarization direction of the incident light. Thus, B light emerges still as S-polarized light from the second color-selective wave plate 6b, whereas R light is converted and emerges as S-polarized light from the second color-selective wave plate 6b.

Moreover, after unnecessary polarization components are further eliminated with the polarizing plate 12d, the B light and the R light is incident as S-polarized light on the polarization color combining prism 13. Then, it is reflected by a polarization color combining film 13c of the polarization color combining prism 13, and thus combined with the P-polarized G projection light that has been transmitted through the polarization color combining film 13c.

The combined RGB projection light is projected by the projection lens 11 onto a projection surface, such as a screen.

The polarization color combining prism 13 of this embodiment is made by joining together two triangular prisms 13a and 13b. A polarization color combining film 13c made of a multilayer film is provided at the junction surface of the first triangular prism 13a, and is attached with an adhesive to the second triangular prism 13b.

Figure 5A:
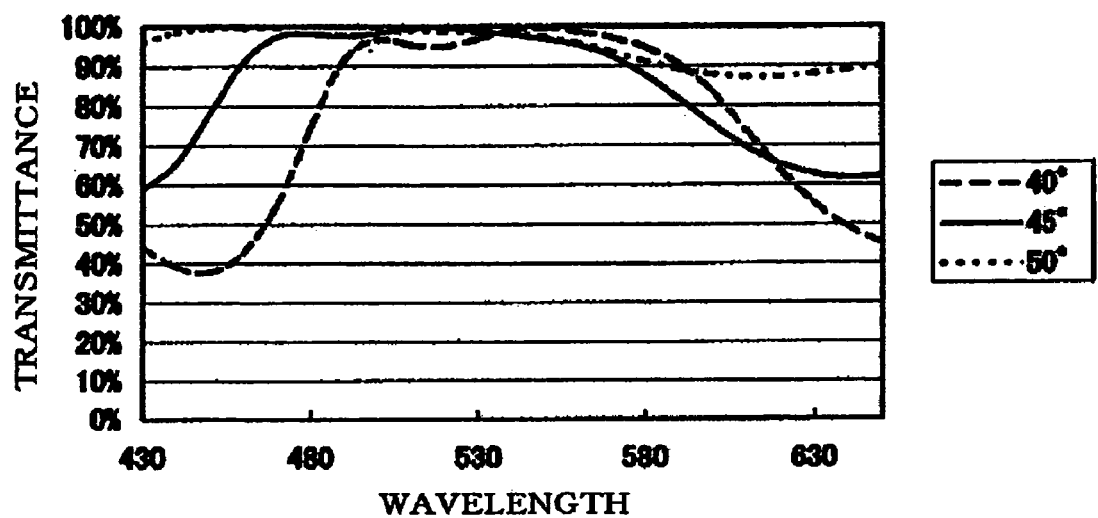
FIG. 5A and FIG. 5B are graphs illustrating the characteristics of a polarization color combining prism of Embodiment 1.
Figure 5B:
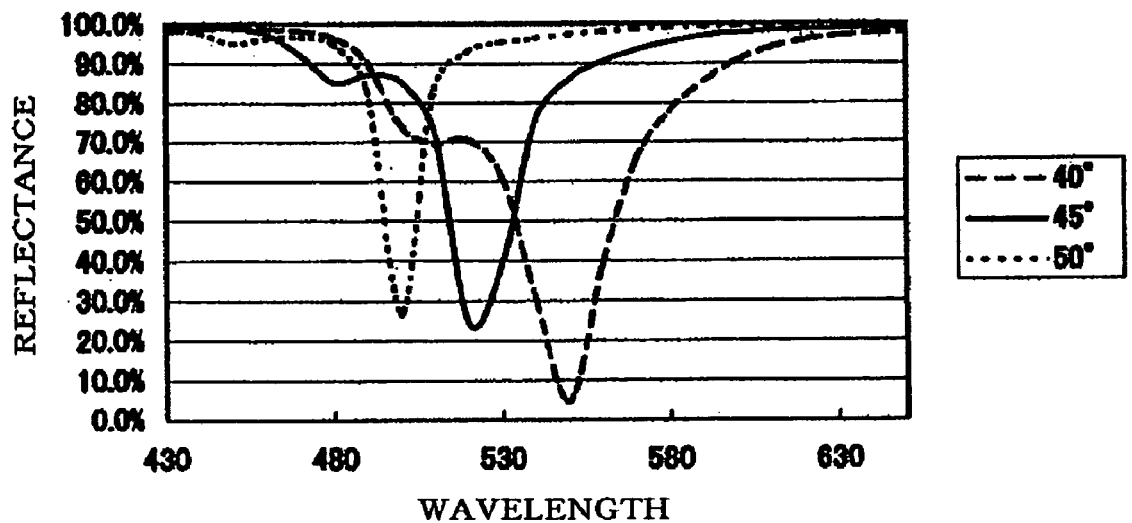

Table 1 below shows a design example of the polarization color combining film 13c used in the present embodiment. This polarization color combining film 13c is made by layering 15 films (of two kinds of materials) on the first triangular prism 13a serving as the base. FIGS. 5A and 5B are graphs showing its characteristics. FIG. 5A shows the transmittance for P-polarized light for incidence angles of 40°, 45° and 50° on the polarization color combining film 13c and FIG. 5B shows the reflectance for S-polarized light for incidence angles of 40°, 45° and 50° on the polarization color combining film 13c.

TABLE 1

| Film | Thickness (nm) | Refractive index |
|---|---|---|
| Adhesive | | 1.51 |
| 1 | 97 | 1.46 |
| 2 | 82 | 2.30 |
| 3 | 158 | 1.46 |
| 4 | 93 | 2.30 |
| 5 | 156 | 1.46 |
| 6 | 85 | 2.30 |
| 7 | 98 | 1.46 |
| 8 | 141 | 2.30 |
| 9 | 107 | 1.46 |
| 10 | 61 | 2.30 |
| 11 | 88 | 1.46 |
| 12 | 45 | 2.30 |
| 13 | 86 | 1.46 |
| 14 | 172 | 2.30 |
| 15 | 84 | 1.46 |
| Base | | 1.52 |

When the wavelength range for green (G) is defined as 500 to 570 nm, the wavelength range for red (R) is defined as 590 to 650 nm, and the wavelength range for blue (B) is defined as 430 to 480 nm, then the average transmittance (and the average reflectance) at a predetermined angular range (±5°) with respect to a reference angle of incidence of 45° on the polarization color combining film 13c can be determined as $$Tpg=(Tpg40+Tpg45+Tpg50)/3$$

where Tgp45 is the average transmittance in the wavelength range of G at an incidence angle of 45°, and Tpg40 and Tpg50 are the average transmittances in the wavelength range of G at incidence angles of 45°±5°.

Similarly, it is possible to determine the average transmittance (and the average reflectance) of other wavelength ranges.

The average transmittance of the polarization color combining film 13c for P-polarized light in the wavelength range of G is thus:

$$Tpg=94.7\% \geq 90\%,$$

the average reflectance for S-polarized light in the wavelength range of R is:

$$Rsr=97.2\% \geq 90\%, \text{ and}$$

the average reflectance for S-polarized light in the wavelength range of B is:

$$Rsb=96.7\% \geq 90\%.$$

In the polarization color combining film 13c with the film structure shown in Table 1, the refractive index nH of the material with the higher refractive index is 2.3, whereas the refractive index nL of the material with the lower refractive index is 1.46, so that when the refractive index nB of the glass material (base) of the polarization color combining prism is determined such that an incidence angle of 45° on the polarization color combining film 13c is the Brewster angle, then it becomes:

$$nB=\sqrt{(2\times nH^2+nL^2/(nH^2+nL^2))}=1.74$$

Here, a glass (base) with a refractive index of 1.52 is used, so that the film structure is attained in which the Brewster condition is not satisfied for P-polarized light, and low reflection characteristics are attained only for the wavelength region of G.

Moreover, in the film structure of the polarization color combining film 13c, material with high refractive index and material with low refractive index are layered in alternation, and by providing the various layers with different thicknesses (film thicknesses), the periodicity of the alternating layers is reduced, and alternating reflective bands and transmissive bands are not generated. Thus, a highly efficient transmittance and reflectance that do not sway with the angular characteristics are attained in a predetermined wavelength region.

Here, by taking the wavelength region of visible light as 430 to 650 nm, the average transmittance of the polarization color combining film 13c for P-polarized light in the wavelength region of visible light is $$Tpw=84.5\% \geq 75\%,$$

and its average reflectance for S-polarized light in the wavelength region of visible light is $$Rsw=84.5\% \geq 75\%.$$

That is to say, the polarization color combining film 13c has the characteristics that it transmits most of the P-polarized light and reflects most of the S-polarized light of the visible wavelength range. However, different to ordinary polarization splitting surfaces, the characteristics are not uniform with regard to light of the respective wavelength regions in the angular region of an incidence angle of 45°±5°.

The average reflectance of the polarization color combining film 13c for P-polarized light in the wavelength region of G is $$Rpg=2.6\%,$$

its average reflectance for P-polarized light in the wavelength region of R is $$Rpr=25.9\%,$$

its average reflectance for P-polarized light in the wavelength region of B is $$Rpb=23.6\%,$$

its average transmittance for S-polarized light in the wavelength region of G is $$Tsg=30.4\%,$$

its average transmittance for S-polarized light in the wavelength region of R is $$Tsr=2.8\%, \text{ and}$$

its average transmittance for S-polarized light in the wavelength region of B is $$Tsb=3.3\%.$$

The ratios of the average reflectance of the polarization color combining film 13 for P-polarized light in the wavelength region of G to its average reflectance for P-polarized light in the wavelength regions of R and B are $Rpg/Rpr$=0.099<0.5, and $Rpg/Rpb$=0.108<0.5.

The ratios of the average transmittance of the polarization color combining film 13 for S-polarized light in the wavelength regions of R and B to its average reflectance for S-polarized light in the wavelength region of G are $Tsr/Tsg$=0.091<0.5, and $Tsb/Tsg$=0.108<0.5.

Thus, by setting the film characteristics such that only the wavelength ranges for which the colors are combined in the present embodiment become highly efficient, angular fluctuations can be reduced.

Embodiment 2

Figure 6:
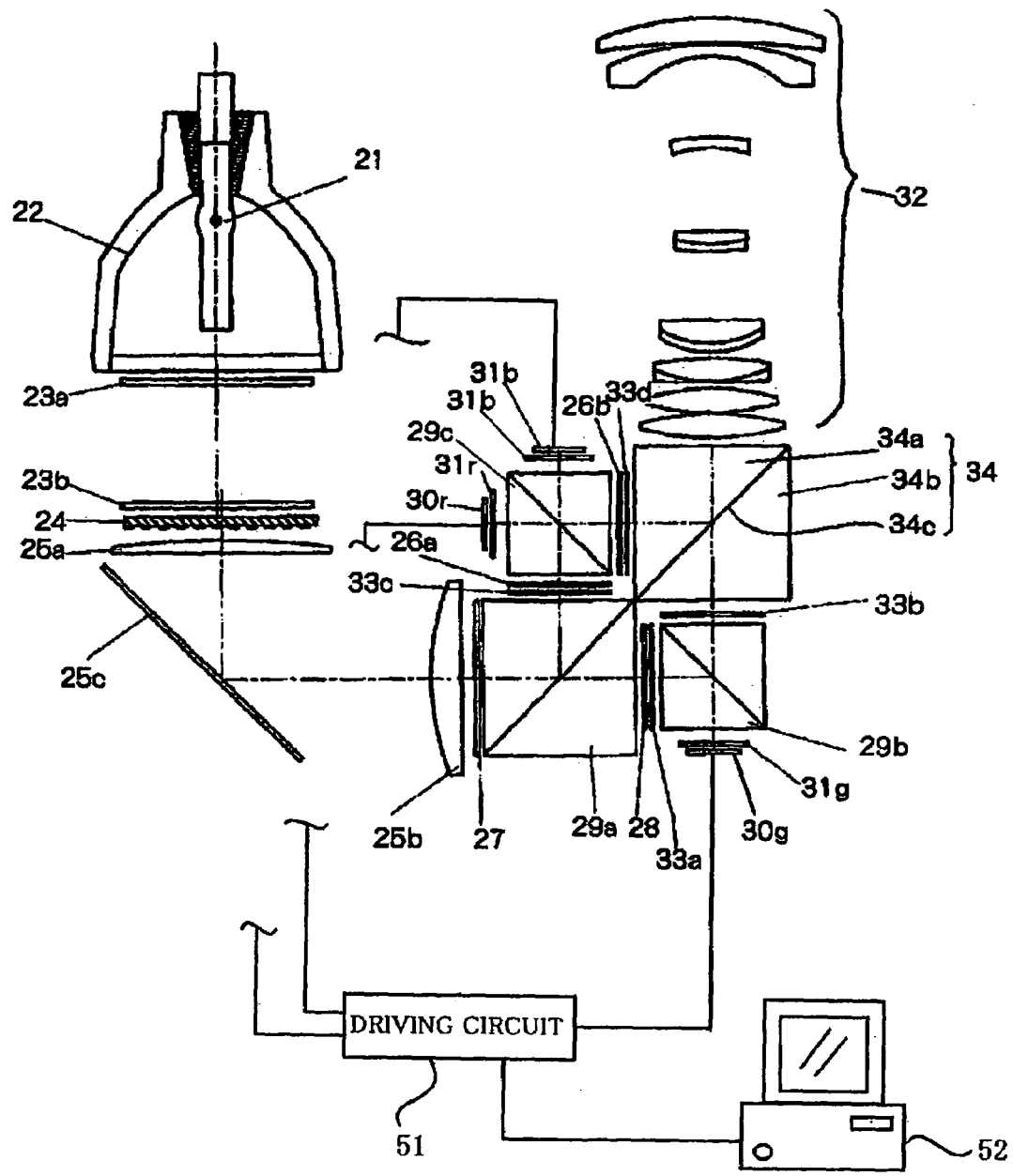
FIG. 6 shows an example of the structure of an image projection apparatus according to Embodiment 2 of the present invention.

FIG. 6 shows an example of the structure of an image projection apparatus according to Embodiment 2 of the present invention. In FIG. 6, reference numeral 21 denotes a light source emitting white light with a continuous spectrum, reference numeral 22 denotes a reflector condensing light in a predetermined direction, reference numeral 23a denotes a first fly-eye lens made by arranging rectangular lenses in a matrix, and reference numeral 23b denotes a second fly-eye lens made of a lens array corresponding to the individual lenses in the first fly-eye lens 22a. Reference numeral 24 denotes a polarization conversion element, which aligns unpolarized light to light which has a predetermined polarization direction. Reference numerals 25a and 25b denote condenser lenses, and reference numeral 25c denotes a reflection mirror.

Reference numeral 26a denotes a first color-selective wave plate, which converts the polarization direction of B light by 90° but does not convert the polarization direction of R light. Reference numeral 26b denotes a second color-selective wave plate, which converts the polarization direction of R light by 90° but does not convert the polarization direction of B light.

Reference numeral 27 denotes a third color-selective wave plate, which converts the polarization direction of G light by 90° but does not convert the polarization direction of B and R light.

Reference numeral 28 denotes a ½ wave plate, and reference numerals 29a, 29b, and 29c respectively denote a first polarization beam splitter, a second polarization beam splitter, and a third polarization beam splitter, which transmit P-polarized light and reflect S-polarized light.

Moreover, reference numeral 34 denotes a polarization color combining prism that transmits P-polarized G light and reflects S-polarized R and B light.

Reference numerals 30r, 30g and 30b respectively denote a reflective liquid crystal display element (image-forming element) for red, a reflective liquid crystal display element for green, and a reflective liquid crystal display element for blue, which reflect the respective color light (incident light) and perform image modulation.

These reflective liquid crystal display elements 30r, 30g and 30b are connected to a driving circuit 51. The driving circuit 51 is supplied with image signals from an image information supplying apparatus 52, such as a personal computer, a DVD player, a video deck or a television receiver, and drives the liquid crystal display elements 30r, 30g and 30b in response to the supplied image signals. Thus, the light of the various colors incident on the liquid crystal display elements 30r, 30g and 30b is image-modulated and reflected.

Reference numerals 31r, 31g and 31b respectively denote a ¼ wave plate for red, a ¼ wave plate for green, and a ¼ wave plate for blue. Reference numeral 32 denotes a projection lens, and reference numerals 33a, 33b and 33c respectively denote polarizing plates.

The polarization conversion element 24 is made of polarization splitting surfaces, reflecting surfaces and ½ wave plates, and has such a structure that incident non-polarized light emerges from it aligned as S-polarized light.

Figure 7:
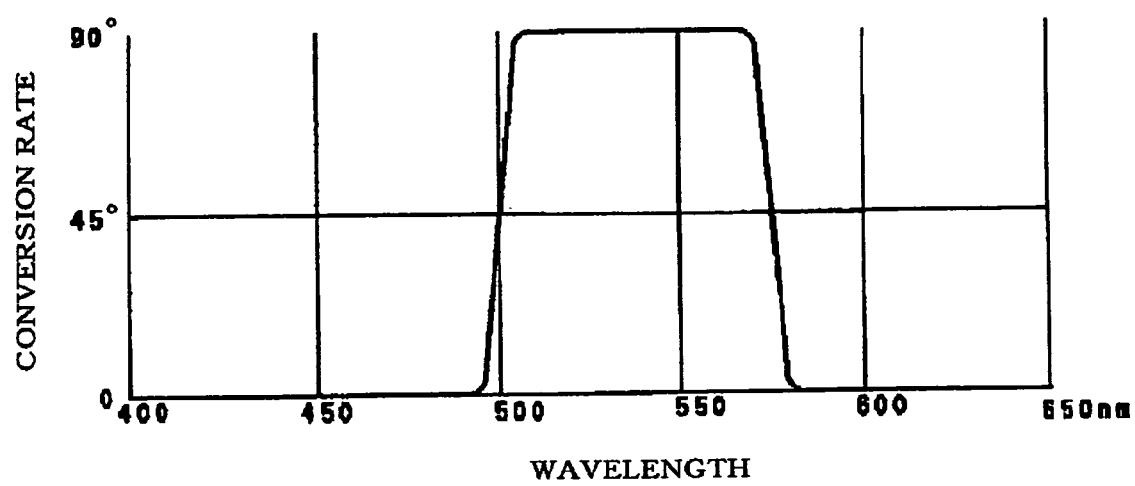
FIG. 7 is a graph illustrating the characteristics of a color-selective wave plate of Embodiment 2.

The third color-selective wave plate 27, which is provided in the illumination optical path, has the characteristics shown by the solid line in FIG. 7. Incident B and R light emerges from it unchanged as S-polarized light, whereas G light is converted to P-polarized light and emerges from it.

The light whose polarization direction has been adjusted by the third color-selective wave plate 27 is incident on the first polarization beam splitter 29a. The G light, which is P-polarized, is transmitted through the polarization splitting surface of the first polarization beam splitter 29a, and the R and B light, which is S-polarized light, is reflected by the first polarization beam splitter 29a. Thus, color separation is carried out.

The polarization direction of the color-separated G light is converted by the ½ wave plate 28, and after the polarization direction has been aligned by the polarizing plate 33a, the G light is incident as S-polarized light on the second polarization beam splitter 29b. Then, it is reflected by the polarization splitting surface of the second polarization beam splitter 29b and reaches the reflective liquid crystal display element 30g for G light.

At the reflective liquid crystal display element 30g for G light, the G light is image-modulated and reflected. The S-polarized component of the image-modulated G light is again reflected by the polarization splitting surface of the second polarization beam splitter 29b, is returned to the light source side and thus eliminated from the projection light.

The P-polarized component of the image-modulated G light is transmitted through the polarization splitting surface of the second polarization beam splitter 29b, and after unnecessary polarization components are further eliminated with the polarizing plate 33b, the G light is incident as P-polarized light on the polarization color combining prism 34, is transmitted through the polarization color combining prism 34 and reaches the projection lens 32.

The R and B light reflected by the first polarization beam splitter 29a is incident on the first color-selective wave plate 26a. The first color-selective wave plate 26a has characteristics as shown in FIG. 3, and the R light emerges unchanged as P-polarized light, whereas the B light is converted into S-polarized light.

Thus, the B light is incident as P-polarized light and the R light is incident as S-polarized light on the third polarization beam splitter 29c. The B light is transmitted through the polarization splitting surface of the third polarization beam splitter 29c and reaches the reflective liquid crystal display element 30b for B light. On the other hand, the R light is reflected by the polarization splitting surface of the third polarization beam splitter 29c and reaches the reflective liquid crystal display element 30r for R light.

At the reflective liquid crystal display element 30b for B light, the B light is image-modulated and reflected. The P-polarized light component of the image-modulated B light is again transmitted through the polarization splitting surface of the third polarization beam splitter 29c and is returned to the light source side and thus eliminated from the projection light.

The S-polarized light component of the modulated B light is reflected by the polarization splitting surface and becomes the projection light. Similarly, at the reflective liquid crystal display element 30r for R light, the R light is image-modulated and reflected. The S-polarized light component of the modulated R light is again reflected by the polarization splitting surface of the third polarization beam splitter 29c and is returned to the light source side and thus eliminated from the projection light. The P-polarized light component of the modulated and reflected R light is transmitted through the polarization splitting surface of the third polarization beam splitter 29c and becomes the projection light. Thus, the B and R projection light is combined into one light flux.

The combined R and B projection light is incident on the second color-selective wave plate 26b. The second color-selective wave plate 26b has the characteristics shown in FIG. 4 and rotates only the polarization direction of the R light by 90°. Thus, both the R and B light is converted into S-polarized light, and reaches the polarization color combining prism 34. Then, it is combined with the G projection light by being reflected at the polarization color combining film 34c.

The polarization color combining prism 34 of the present embodiment is made by joining together two triangular prisms 34a and 34b. A polarization color combining film 34c made of a multilayer film is provided at the junction surface of the first triangular prism 34a, and is attached with an adhesive to the second triangular prism 34b.

Figure 8A:
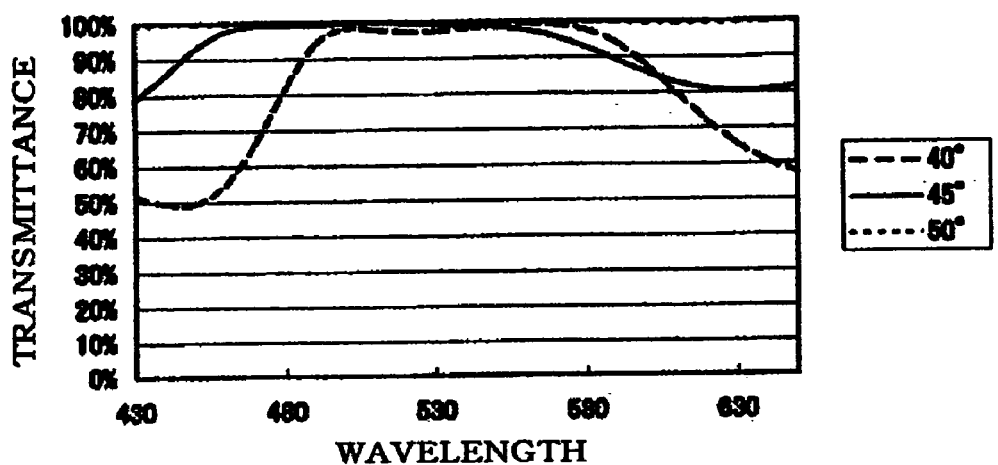
FIG. 8A and FIG. 8B are graphs illustrating the characteristics of a polarization color combining prism of Embodiment 2.
Figure 8B:
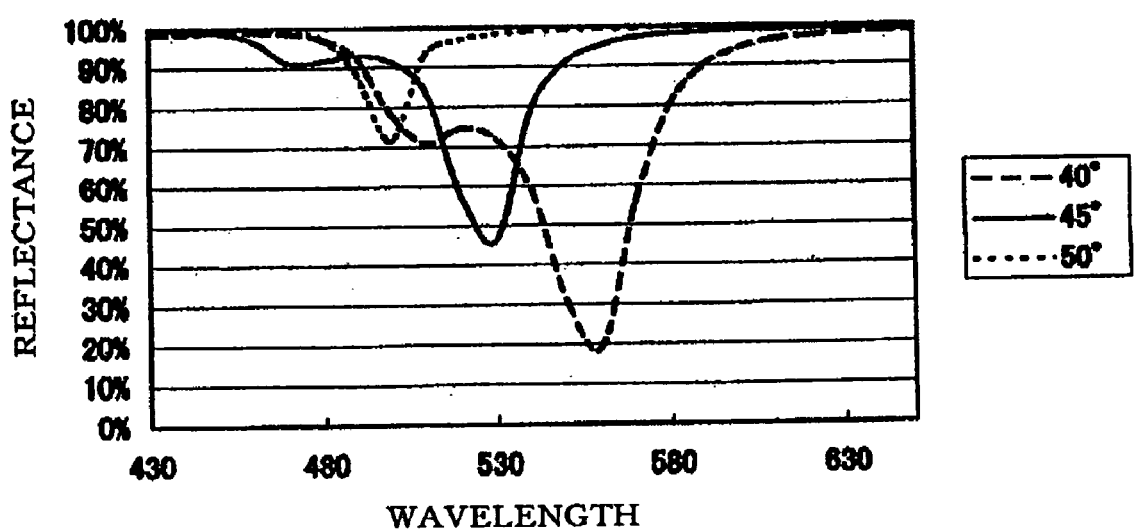

Table 2 below shows a design example of the polarization color combining film 34c used in the present embodiment. This polarization color combining film 34c is made by layering 15 films (of two kinds of materials) on a first triangular prism 13a serving as the base. FIGS. 8A and 8B are graphs showing its characteristics. FIG. 8A shows the transmittance for P-polarized light for incidence angles of 40°, 45° and 50° on the polarization color combining film 34c and FIG. 8B shows the reflectance for S-polarized light for incidence angles of 40°, 45° and 50° on the polarization color combining film 34c.

TABLE 2

| Film | Thickness (nm) | Refractive index |
| --- | --- | --- |
| Adhesive | | 1.51 |
| 1 | 100 | 1.46 |
| 2 | 84 | 2.30 |
| 3 | 167 | 1.46 |
| 4 | 91 | 2.30 |
| 5 | 175 | 1.46 |
| 6 | 85 | 2.30 |
| 7 | 100 | 1.46 |
| 8 | 147 | 2.30 |
| 9 | 110 | 1.46 |
| 10 | 61 | 2.30 |
| 11 | 93 | 1.46 |
| 12 | 47 | 2.30 |
| 13 | 96 | 1.46 |
| 14 | 164 | 2.30 |
| 15 | 44 | 1.46 |
| Base | | 1.61 |

Here, the refractive index of the adhesive is 1.51, and the refractive index of the base is 1.61, so that a Fresnel reflection occurs at the junction surface of the adhesive and the second triangular prism 34b, and there is a slight loss of light. Therefore, it is also possible to provide an anti-reflective film on the junction surface of the second triangular prism 34b, and to join the polarization color combining film 34c and the anti-reflective film together with an adhesive.

When the wavelength range for green (G) is defined as 500 to 570 nm, the wavelength range for red (R) is defined as 590 to 650 nm, and the wavelength range for blue (B) is defined as 430 to 480 nm, then the average transmittance of the polarization color combining film 34c for P-polarized light in the wavelength range of G is:

$Tpg = 99.0\% \geq 90\%$, its average reflectance for S-polarized light in the wavelength range of R is:

$Rsr = 98.2\% \geq 90\%$, and its average reflectance for S-polarized light in the wavelength range of B is:

$Rsb = 97.8\% \geq 90\%$.

Here, taking the wavelength region of visible light as 430 to 650 nm, the average transmittance of the polarization color combining film 34c for P-polarized light in the wavelength region of visible light is $Tpw = 90.7\% \geq 75\%$, and its average reflectance for S-polarized light in the wavelength region of visible light is $Rsw = 90.3\% \geq 75\%$.

That is to say, the polarization color combining film 34c has the characteristics that it transmits most of the P-polarized light and reflects most of the S-polarized light in the visible wavelength range. However, different to ordinary polarization splitting surfaces, the characteristics are not uniform with regard to light of the respective wavelength regions in the angular region of an incidence angle of 45°±5°.

The average reflectance of the polarization color combining film 34c for P-polarized light in the wavelength region of G is $Rpg = 1.0\%$, its average reflectance for P-polarized light in the wavelength region of R is $Rpr = 14.4\%$, its average reflectance for P-polarized light in the wavelength region of B is $Rpb = 16.4\%$, its average transmittance for S-polarized light in the wavelength region of G is $Tsg = 22.6\%$, its average transmittance for S-polarized light in the wavelength region of R is $Tsr = 1.8\%$, and its average transmittance for S-polarized light in the wavelength region of B is $Tsb = 2.2\%$.

The ratios of the average reflectance for P-polarized light in the wavelength region of G to the average reflectance for P-polarized light in the wavelength regions of R and B are Rpg/Rpr=0.073<0.5, and Rpg/Rpb=0.064<0.5.

The ratios of the average transmittance for S-polarized light in the wavelength regions of R and B to the average reflectance for S-polarized light in the wavelength region of G are Tsr/Tsg=0.080<0.5, and Tsb/Tsg=0.097<0.5.

Embodiment 3

Figure 9A:
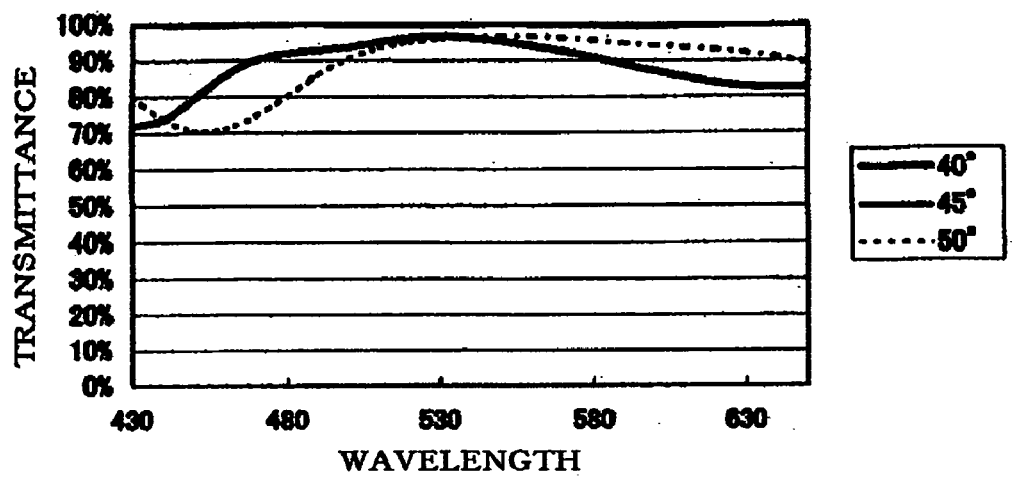
FIG. 9A and FIG. 9B are graphs illustrating the characteristics of a polarization color combining prism of Embodiment 3 of the present invention.
Figure 9B:
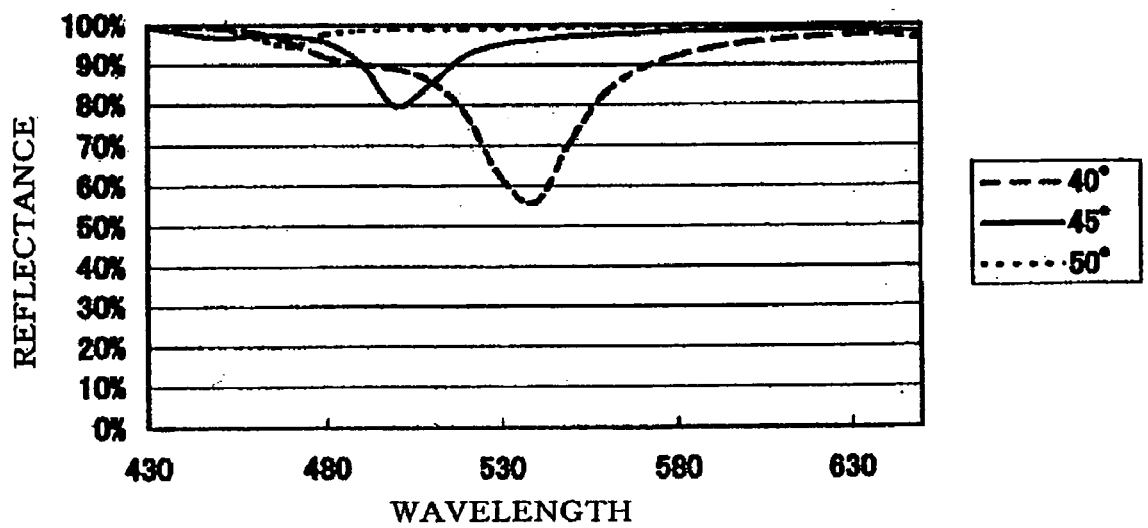

Table 3 below shows a design example of a polarization color combining film (13c, 34c) provided on a polarization color combining prism (13, 34) of an image projection apparatus according to Embodiment 3 of the present invention, which is as described in Embodiment 1 or Embodiment 2. This polarization color combining film is made by layering 13 films (of two kinds of materials) on a first triangular prism (13a, 34a) serving as the base. FIGS. 9A and 9B are graphs showing its characteristics. FIG. 9A shows the transmittance of P-polarized light for incidence angles of 40°, 45° and 50° on the polarization color combining film and FIG. 9B shows the reflectance for S-polarized light for incidence angles of 40°, 45° and 50° on the polarization color combining film.

TABLE 3

| Film | Thickness (nm) | Refractive index |
|---|---|---|
| Adhesive | | 1.51 |
| 1 | 268 | 1.46 |
| 2 | 142 | 2.30 |
| 3 | 109 | 1.46 |
| 4 | 117 | 2.30 |
| 5 | 202 | 1.46 |
| 6 | 45 | 2.30 |
| 7 | 155 | 1.46 |
| 8 | 46 | 2.30 |
| 9 | 172 | 1.46 |
| 10 | 142 | 2.30 |
| 11 | 136 | 1.46 |
| 12 | 34 | 2.30 |
| 13 | 114 | 1.46 |
| Base | | 1.74 |

When the wavelength range for green (G) is defined as 500 to 570 nm, and the wavelength range for red (R) is defined as 590 to 650 nm, and the wavelength range for blue (B) is defined as 430 to 480 nm, then the average transmittance of the polarization color combining film for P-polarized light in the wavelength range of G is:

Tpg=96.6%>90%, its average reflectance for S-polarized light in the wavelength range of R is:

Rsr=97.8%>90%, and its average reflectance for S-polarized light in the wavelength range of B is:

Rsb=97.5%>90%.

In this embodiment, the refractive index of the glass constituting the polarization color combining prism substantially satisfies the Brewster condition, but by adjusting the film thicknesses such that an anti-reflection effect is attained in a narrow band range, the same effect as in Embodiment 1 and Embodiment 2 can be attained. In this case, the design is adjusted such that the anti-reflection effect in a narrow band is attained at incidence angles (40°, 50°) that deviate from the reference incidence angle (45°).

Moreover, taking the wavelength region of visible light as 430 to 650 nm, the average transmittance of the polarization color combining film for P-polarized light in the wavelength region of visible light is Tpw=92.2%>75%, and its average reflectance for S-polarized light in the wavelength region of visible light is Rsw=94.6%>75%.

That is to say, the polarization color combining film has the characteristics that it transmits most of the P-polarized light and reflects most of the S-polarized light of the visible wavelength range. However, different to ordinary polarization splitting surfaces, the characteristics are not uniform with regard to light of the respective wavelength regions in the angular region of an incidence angle of 45°±5°.

The average reflectance of the polarization color combining film of the present embodiment for P-polarized light in the wavelength region of G is Rpg=3.4%, its average reflectance for P-polarized light in the wavelength region of R is Rpr=7.7%, its average reflectance for P-polarized light in the wavelength region of B is Rpb=14.3%, its average transmittance for S-polarized light in the wavelength region of G is Tsg=10.5%, its average transmittance for S-polarized light in the wavelength region of R is Tsr=2.2%, and its average transmittance for S-polarized light in the wavelength region of B is Tsb=2.5%.

The ratios of the average reflectance for P-polarized light in the wavelength region of G to the average reflectance for P-polarized light in the wavelength regions of R and B are Rpg/Rpr=0.441<0.5, and Rpg/Rpb=0.236<0.5.

The ratios of the average transmittance for S-polarized light in the wavelength regions of R and B to the average reflectance for S-polarized light in the wavelength region of G are Tsr/Tsg=0.204<0.5, and Tsb/Tsg=0.234<0.5.

Embodiment 4

Table 4 below shows a design example of a polarization color combining film (13c, 34c) provided on a polarization color combining prism (13, 34) of an image projection apparatus according to Embodiment 4 of the present invention, which is as described in Embodiment 1 or Embodiment 2. This polarization color combining film is made by layering 17 films on a first triangular prism (13a, 34a) serving as the base. The above-described Embodiments 1 to 3 had a structure in which thin films of two kinds of materials were layered, but in this embodiment, thin films of three or more kinds of materials are layered.

Figure 10A:
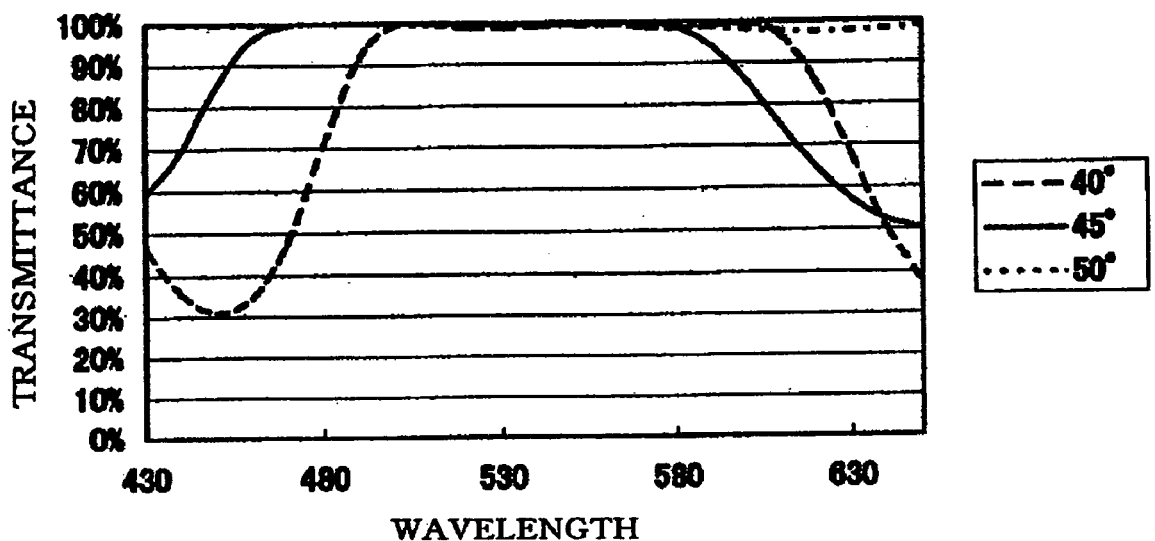
FIG. 10A and FIG. 10B are graphs illustrating the characteristics of a polarization color combining prism of Embodiment 4 of the present invention.
Figure 10B:
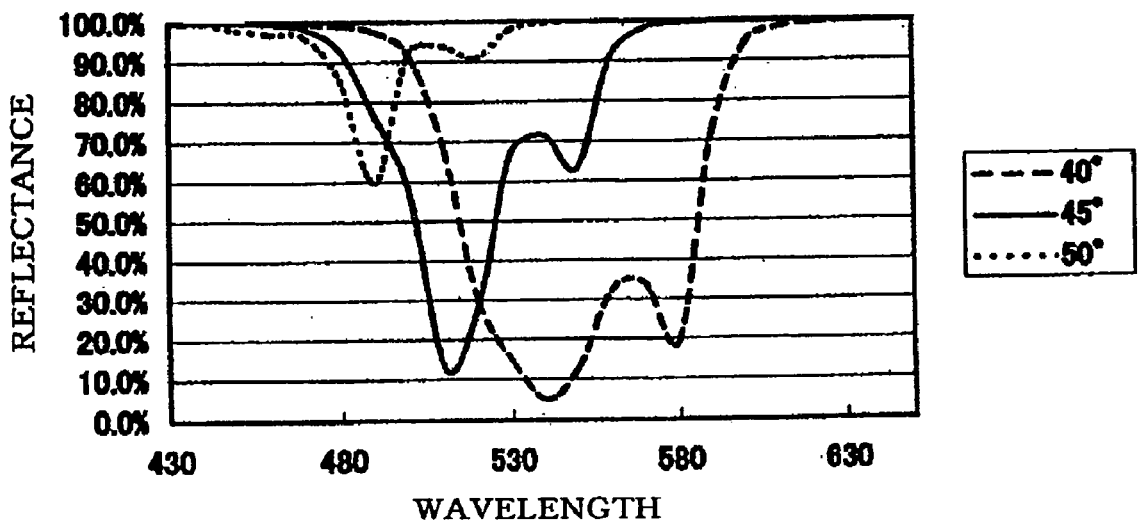

FIGS. 10A and 10B are graphs showing the characteristics of the polarization color combining film. FIG. 10A shows the transmittance of P-polarized light for incidence angles of 40°, 45° and 50° on the polarization color combining film and FIG. 10B shows the reflectance for S-polarized light for incidence angles of 40°, 450° and 50° on the polarization color combining film.

TABLE 4

| Film | Thickness (nm) | Refractive index |
|---|---|---|
| Adhesive | | 1.6 |
| 1 | 118 | 2.12 |
| 2 | 187 | 1.46 |
| 3 | 74 | 2.35 |
| 4 | 178 | 1.46 |
| 5 | 99 | 2.35 |
| 6 | 157 | 1.46 |
| 7 | 78 | 2.35 |
| 8 | 112 | 1.46 |
| 9 | 137 | 2.35 |
| 10 | 100 | 1.46 |
| 11 | 73 | 2.35 |
| 12 | 106 | 1.46 |
| 13 | 145 | 2.35 |
| 14 | 115 | 1.46 |
| 15 | 55 | 2.35 |
| 16 | 94 | 1.46 |
| 17 | 168 | 2.12 |
| Base | | 1.6 |

When the wavelength range for green (G) is defined as 500 to 570 nm, wavelength range for red (R) is defined as 590 to 650 nm, and the wavelength range for blue (B) is defined as 430 to 480 nm, then the average transmittance of the polarization color combining film for P-polarized light in the wavelength range of G is:

$Tpg=99.6\% \geq 90\%$, its average reflectance for S-polarized light in the wavelength range of R is:

$Rsr=98.2\% \geq 90\%$, and its average reflectance for S-polarized light in the wavelength range of B is:

$Rsb=98.0\% \geq 90\%$.

Moreover, the average transmittance of the polarization color combining film of the present embodiment for P-polarized light in the wavelength region of visible light is $Tpw=87.7\% \geq 75\%$, and its average reflectance for S-polarized light in the wavelength region of visible light is $Rsw=84.5\% \geq 75\%$.

That is to say, the polarization color combining film of the present embodiment has the characteristics that it transmits most of the P-polarized light and reflects most of the S-polarized light of the visible wavelength range. However, different to ordinary polarization splitting surfaces, the characteristics are not uniform with regard to light of the respective wavelength regions in the angular region of an incidence angle of 45°±5°.

The average reflectance of the polarization color combining film of the present embodiment for P-polarized light in the wavelength region of G is $Rpg=0.4\%$, its average reflectance for P-polarized light in the wavelength region of R is $Rpr=18.9\%$, its average reflectance for P-polarized light in the wavelength region of B is $Rpb=23.7\%$, its average transmittance for S-polarized light in the wavelength region of G is $Tsg=35.4\%$, its average transmittance for S-polarized light in the wavelength region of R is $Tsr=1.8\%$, and its average transmittance for S-polarized light in the wavelength region of B is $Tsb=2.0\%$.

The ratios of the average reflectance for P-polarized light in the wavelength region of G to the average reflectance for P-polarized light in the wavelength regions of R and B are $Rpg/Rpr=0.023<0.5$, and $Rpg/Rpb=0.018<0.5$.

The ratios of the average transmittance for S-polarized light in the wavelength regions of R and B to the average reflectance for S-polarized light in the wavelength region of G are $Tsr/Tsg=0.051<0.5$, and $Tsb/Tsg=\mathbf{0.057<0.5}$.

It should be noted that the structure of the film (polarization color combining film) of the polarization color combining prism described in Embodiments 1 to 4 can be used without limitation to the combination of the optical system described in Embodiment 1 and Embodiment 2. That is to say, it is also possible to use it in an optical system with a structure that is different from the optical system described in Embodiment 1 and Embodiment 2, in a color combining system combining P-polarized G light and S-polarized R and B light at one film surface.

Moreover, as long as it is a polarization color combining film with characteristics that satisfy the numerical conditions shown in the present invention, it is possible to achieve the same effect with other design values for the polarization color combining film than those shown in Embodiments 1 to 4.

Moreover, in a color combining system combining S-polarized G light and P-polarized R and B light at one film surface, a polarization color combining film may be used, which has film characteristics as in any of the Embodiments 1 to 4 but with reflection and transmission reversed.

Embodiment 5

Table 5 below shows a design example of a polarization color combining film according to Embodiment 5 of the present invention. The polarization color combining film described in Embodiments 1 to 4 had a structure in which G light is transmitted and magenta (R and B) light is reflected, but the polarization color combining film of this embodiment reflects G light and transmits magenta light. Using it, the same effects as in Embodiments 1 to 4 can be attained.

TABLE 5

| Film | Thickness (nm) | Refractive index |
|---|---|---|
| Adhesive | | 1.51 |
| 1 | 63 | 1.45 |
| 2 | 233 | 2.11 |
| 3 | 62 | 1.45 |
| 4 | 112 | 2.11 |
| 5 | 55 | 1.45 |
| 6 | 112 | 2.11 |
| 7 | 61 | 1.45 |
| 8 | 109 | 2.11 |
| 9 | 66 | 1.45 |
| 10 | 103 | 2.11 |
| 11 | 56 | 1.45 |
| 12 | 111 | 2.11 |
| 13 | 75 | 1.45 |
| 14 | 98 | 2.11 |
| 15 | 106 | 1.45 |
| 16 | 220 | 2.11 |
| 17 | 104 | 1.45 |
| 18 | 114 | 2.11 |
| 19 | 52 | 1.45 |
| 20 | 229 | 2.11 |
| 21 | 58 | 1.45 |
| Base | | 1.6 |

Figure 11A:
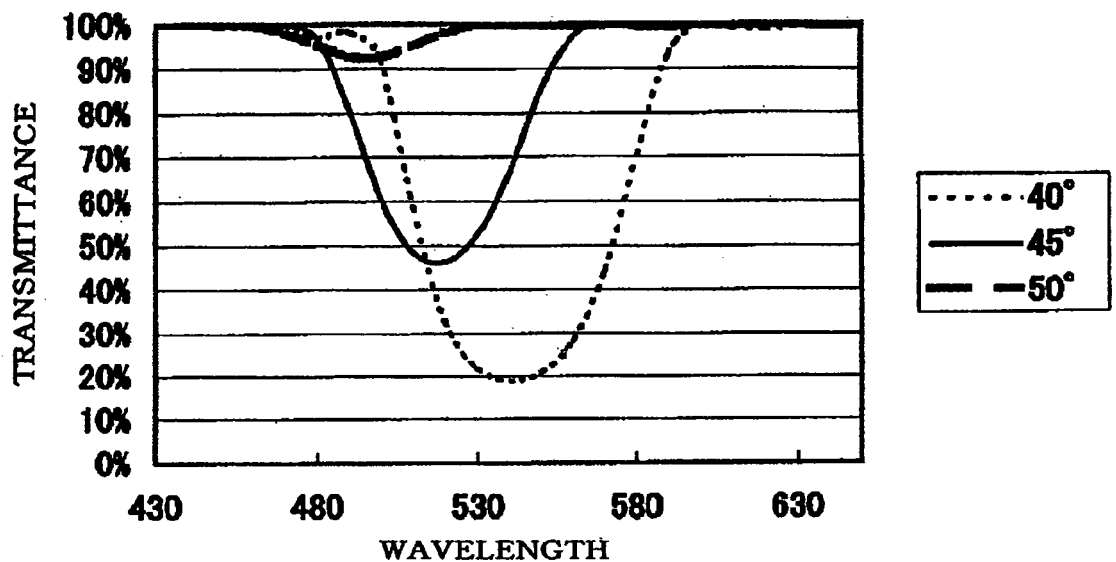
FIG. 11A and FIG. 11B are graphs illustrating the characteristics of a polarization color combining prism of Embodiment 5.
Figure 11B:
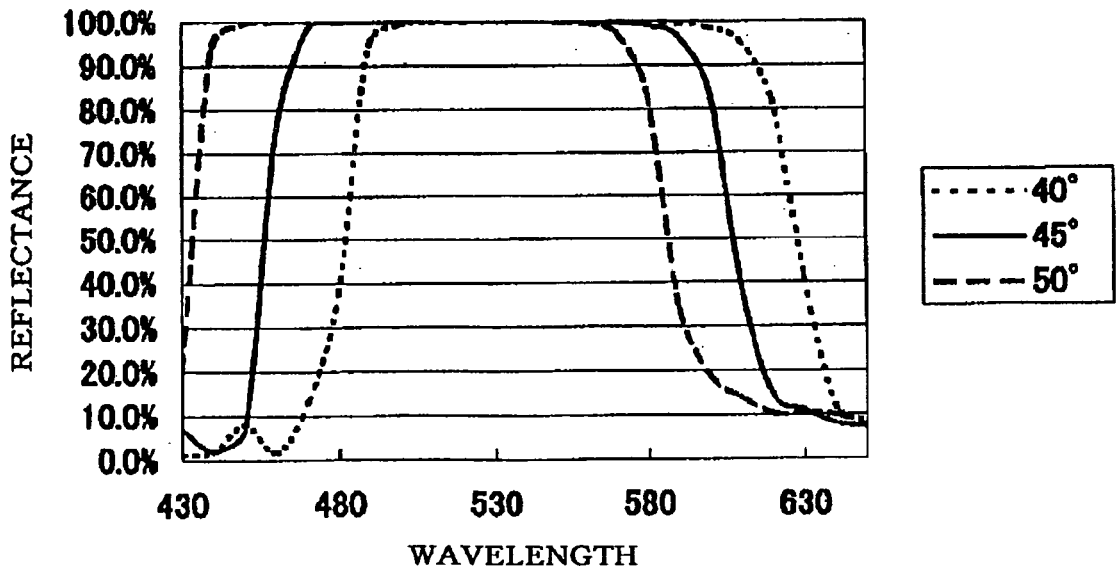
Figure 12:
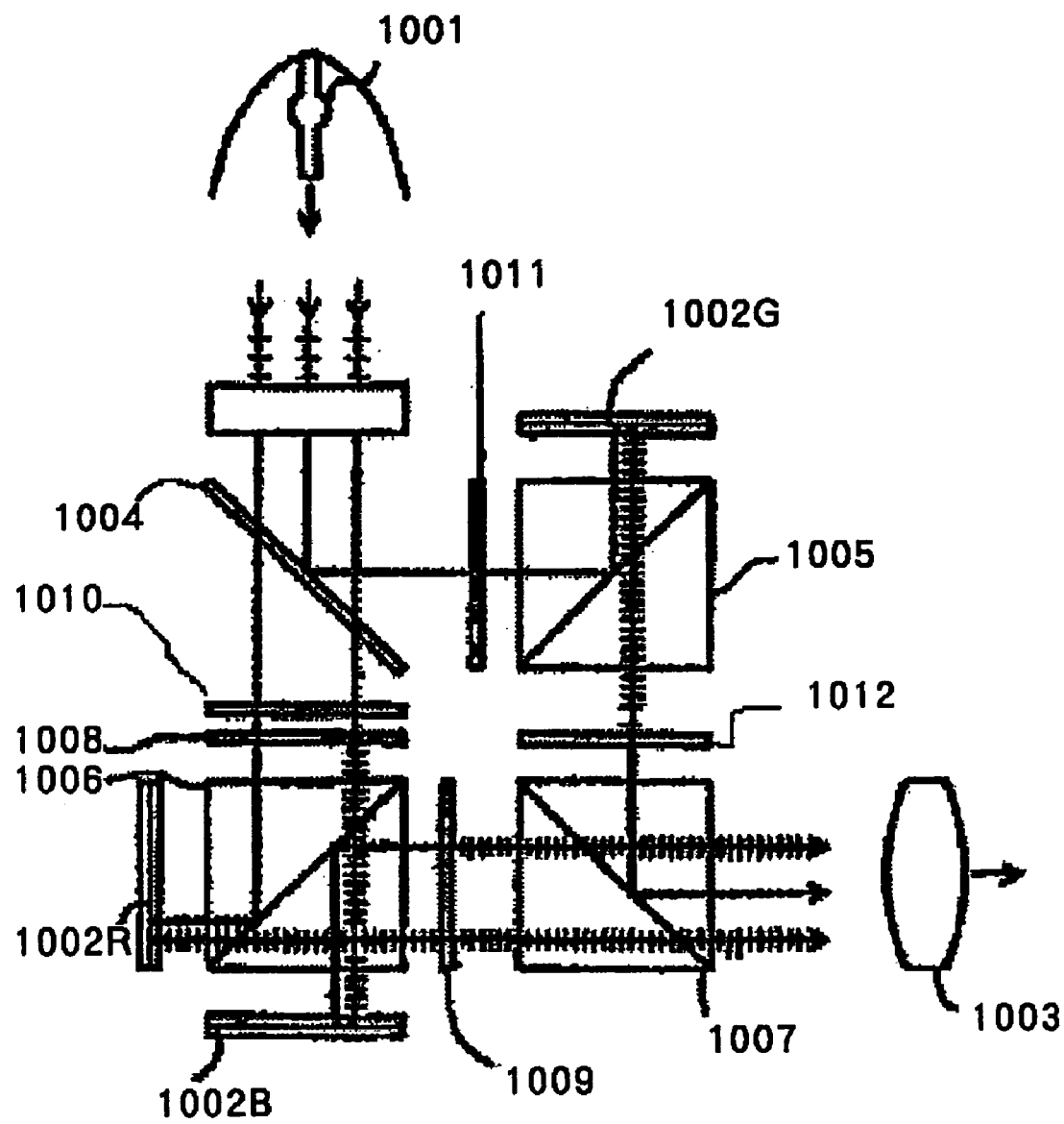
FIG. 12 shows the structure of a conventional image projection apparatus.
Figure 13:
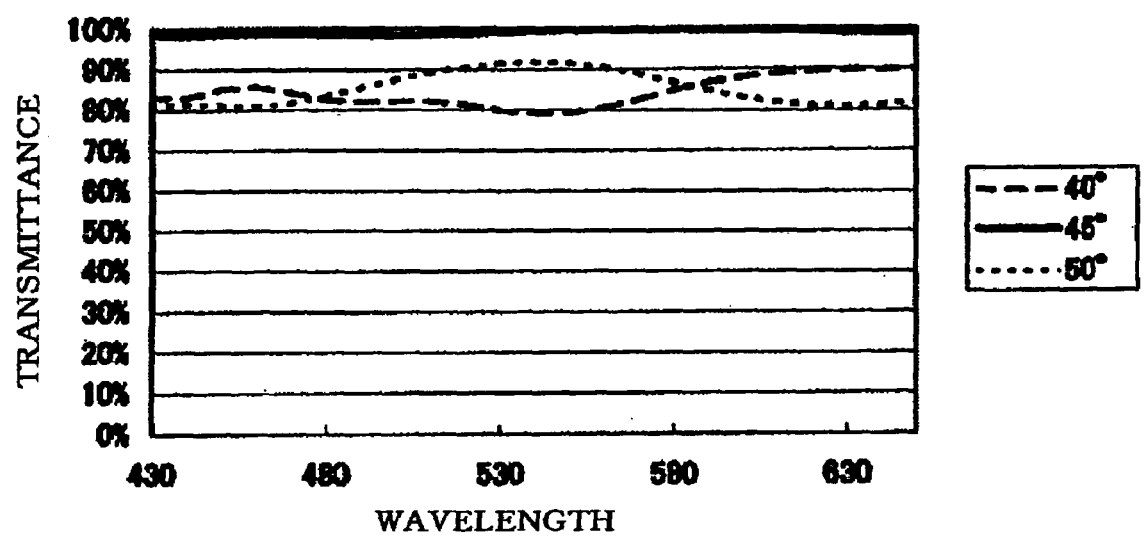
FIG. 13 is a graph showing the transmittance characteristics for P-polarized light of a conventional polarization splitting surface.
Figure 14:
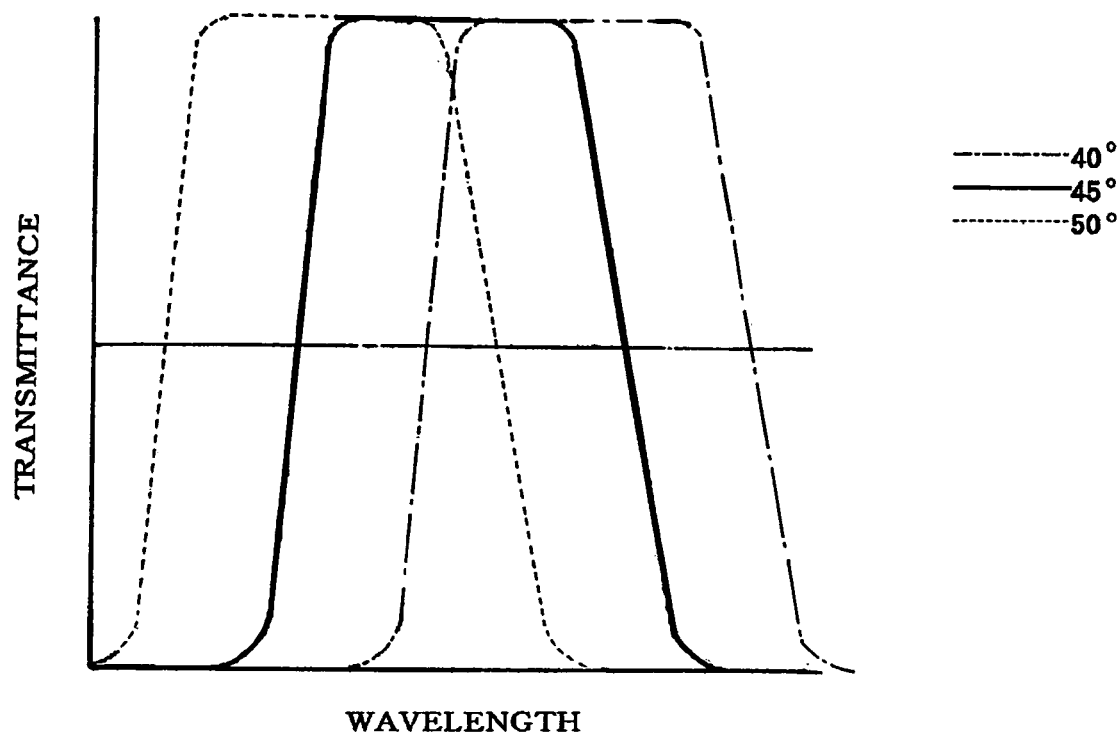
FIG. 14 is a graph showing the transmittance characteristics of a conventional dichroic film.
Figure 15:
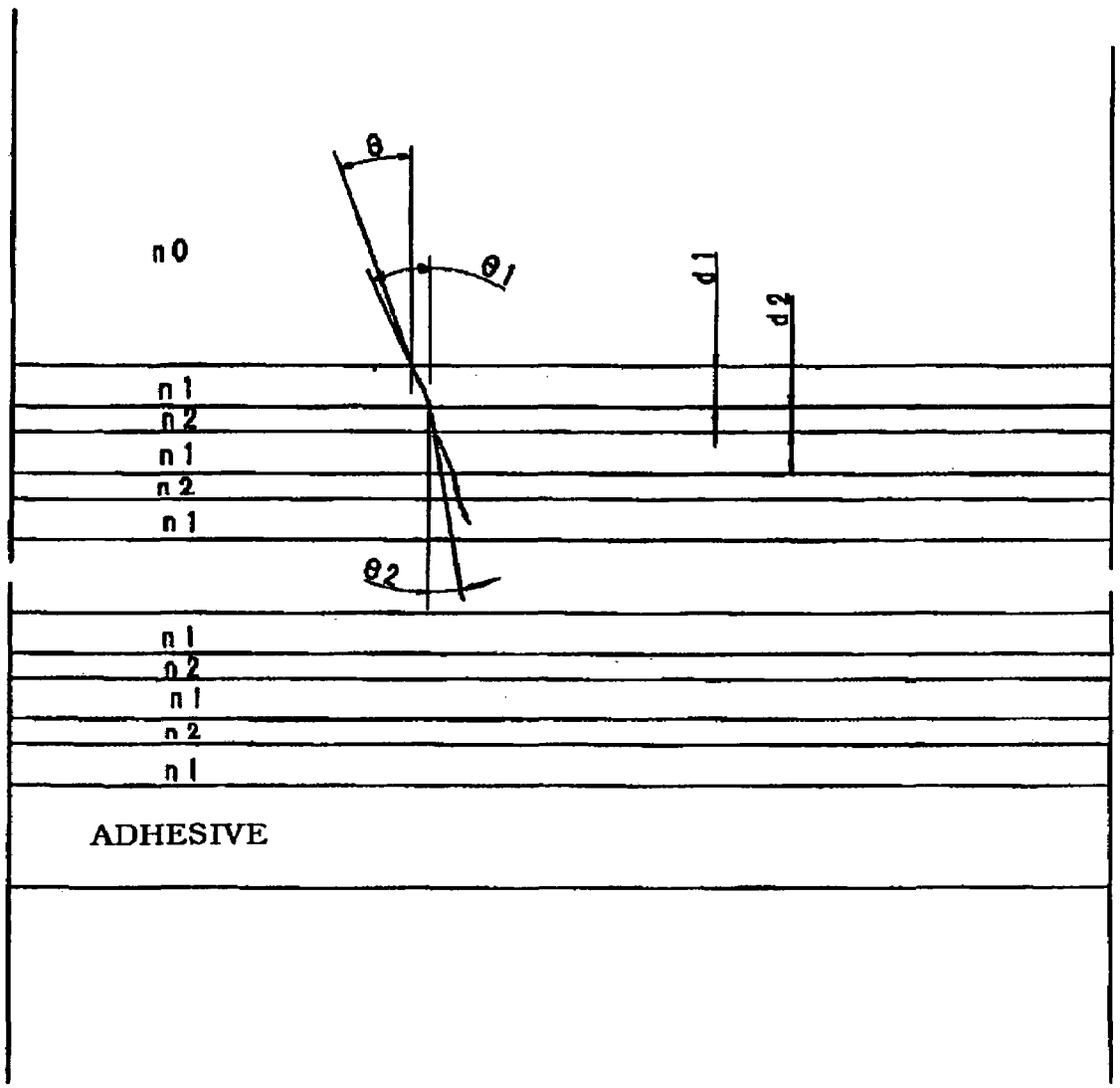
FIG. 15 is a diagram illustrating the characteristics of a conventional dichroic film.

The polarization color combining film of this embodiment is made by layering 21 films on a base (triangular prism of the like). FIGS. 11A and 11B are graphs showing the characteristics of the polarization color combining film. FIG. 11A shows the transmittance of P-polarized light for incidence angles of 40°, 45° and 50° on the polarization color combining film and FIG. 11B shows the reflectance for S-polarized light for incidence angles of 40°, 45° and 50° on the polarization color combining film.

When the wavelength range of green (G) is defined as 500 to 570 nm, the wavelength range of red (R) is defined as 590 to 650 nm, and the wavelength range of blue (B) is defined as 430 to 480 nm, then the average reflectance of the polarization color combining film of the present embodiment for S-polarized light in the wavelength range of G is:

$Rsg=99.7\% \geq 90\%$, the average transmittance for S-polarized light in the wavelength range of R is:

$Tpr=99.3\% \geq 90\%$, and the average transmittance for S-polarized light in the wavelength range of B is:

$Tpb=99.1\% \geq 90\%$.

The average reflectance of the polarization color combining film of the present embodiment for P-polarized light in the wavelength region of G is $Rpg=30.8\%$, its average reflectance for P-polarized light in the wavelength region of R is $Rpr=0.7\%$, its average reflectance for P-polarized light in the wavelength region of B is $Rpb=0.9\%$, its average transmittance for S-polarized light in the wavelength region of G is $Tsg=0.3\%$, its average transmittance for S-polarized light in the wavelength region of R is $Tsr=51.9\%$, and its average transmittance for S-polarized light in the wavelength region of B is $Tsb=61.8\%$.

The ratios of the average reflectance for P-polarized light in the wavelength region of G to the average reflectance for P-polarized light in the wavelength regions of R and B are $Rpr/Rpg=0.022<0.5$, and $Rpb/Rpg=0.029<0.5$.

The ratios of the average transmittance for S-polarized light in the wavelength regions of R and B to the average reflectance for S-polarized light in the wavelength region of G are $Tsg/Tsr=0.004<0.5$, and $Tsg/Tsb=0.005<0.5$.

However, the average transmittance of the polarization color combining film for P-polarized light in the wavelength region of visible light is $Tpw=67.2\%$ and its average reflectance for S-polarized light in the wavelength region of visible light is $Rsw=88.0\%$, and the proportion of the polarized light separation becomes low for P-polarized light. For this reason, dichroic characteristics remain somewhat, and there are fluctuations in the range of reflection and transmission depending on the angle, but this range of fluctuations is small, so that highly efficient color combining is possible.

Thus, with the above-described embodiments, it is possible to achieve a lower light loss in color combining optical systems, and thus to realize a bright image projection apparatus.

What is claimed is:

1. A color combining optical system, which combines a first color light and a second color light, comprising;
a polarization color combining film made of a multilayer film;
wherein the polarization color combining film combines a first polarization component of the first color light and a second polarization component of the second color light, which has a polarization direction substantially perpendicular to the first polarization component, with an efficiency of 90% or more in a predetermined incidence angle range;

wherein the color combining optical system combines the first color light and the second color light, respectively coming from a first and a second image forming elements forming original images, with a third color light from a third image forming element forming an original image, and guides the combined light to a projection optical system;

wherein the color combining optical system further comprises a first and a second analyzing members;

wherein the first color light is guided via the first analyzing member and the polarization color combining film to the projection optical system, and the second color light and the third color light is guided via the second analyzing member and the polarization color combining film to the projection optical system;

wherein the first color light is light of a first wavelength region of 500 to 570 nm, the second color light is light of a second wavelength region of 430 to 480 nm, and the third color light is light of a third wavelength region of 590 to 650 nm;

wherein, when an incidence angle of the light incident on the polarization color combining film is 45°±5°, then a transmittance of the polarization color combining film in the first wavelength region is 90% or more and a reflectance of the polarization color combining film in the second wavelength region and the third wavelength region is 90% or more; and wherein the polarization color combining film transmits 65% or more of P-polarized light and reflects 65% or more of S-polarized light, which are in the visible wavelength region and incident in the predetermined incidence angle region, and the following conditions are satisfied:

$Rp1/Rp2<0.5$ $Rp1/Rp3<0.5$ where Rp1 is an average reflectance for P-polarized light in the first wavelength region, Rp2 is an average reflectance for P-polarized light in the second wavelength region, and Rp3 is an average reflectance for P-polarized light in the third wavelength region, and $Ts2/Ts1<0.5$ $Ts3/Ts1<0.5$ where Ts1 is an average transmittance for S-polarized light in the first wavelength region, Ts2 is an average transmittance for S-polarized light in the second wavelength region, and Ts3 is an average transmittance for S-polarized light in the third wavelength region.

2. The color combining optical system according to claim 1,
wherein the polarization color combining film transmits 75% or more of P-polarized light which is in the visible wavelength region and incident in the predetermined incidence angle region.

3. The color combining optical system according to claim 1,
wherein the polarization color-combining film reflects 75% or more of the S-polarized light which is the visible wavelength region and incident in the predetermined incidence angle region.

4. An image projection apparatus, comprising:
a light source;
a color separating optical system which separates light from the light source into at least a first color-light and a second color light;
at least two image forming elements;
a color combining optical system according to claim 1, which combines the first color light and the second color light from the image forming elements; and
a projection optical system which projects light combined by the color combining optical system.

5. A color combining optical system, which combines a first color light and a second color light, comprising:
a polarization color combining film made of a multilayer film;

wherein the polarization color combining film combines a first polarization component of the first color light and a second polarization component of the second color light, which has a polarization direction substantially perpendicular to the first polarization component, with an efficiency of 90% or more in a predetermined incidence angle range;

wherein the color combining optical system combines the first color light and the second color light, respectively coming from a first and a second image forming elements forming original images, with a third color light from a third image forming element forming an original image, and guides the combined light to a projection optical system;

wherein the color combining optical system further comprises a first and a second analyzing members;

wherein the first color light is guided via the first analyzing member and the polarization color combining film to the projection optical system, and the second color light and the third color light is guided via the second analyzing member and the polarization color combining film to the projection optical system;

wherein the first color light is the light of a first wavelength region of 500 to 570 nm, the second color light is light of a second wavelength region of 430 to 480 nm, and the third color light is light of a third wavelength region of 590 to 650 nm;

wherein, when the incidence angle of the light incident on the polarization color combining film is 45°±5°, then a reflectance of the polarization color combining film in the first wavelength region is 90% or more and the transmittance of the polarization color combining film in the second wavelength region and the third wavelength is 90% or more;

wherein the polarization color combining film transmits 65% or more of P-polarized light and reflects 65% or more of S-polarized light, which are incident in the predetermined incidence angle region, and the following conditions are satisfied:

$Rp2/Rp1<0.5$ $Rp3/Rp1<0.5$ where Rp1 is an average reflectance for P-polarized light in the first wavelength region, Rp2 is an average reflectance for P-polarized light in the second wavelength region, and Rp3 is an average reflectance for P-polarized light in the third wavelength region, and $Ts1/Ts2<0.5$ $Ts1/Ts3<0.5$ where Ts1 is an average transmittance for S-polarized light in the first wavelength region, Ts2 is an average transmittance for S-polarized light in the second wavelength region, and Ts3 is an average transmittance for S-polarized light in the third wavelength region.

6. The color combining optical system according to claim 5,
wherein the polarization color combining film transmits 75% or more of P-polarized light which is in the visible wavelength region and incident in the predetermined incidence angle region.

7. The color combining optical system according to claim 5,
wherein the polarization color combining film reflects 75% or more of S-polarized light which is in the visible wavelength region and incident in the predetermined incidence angle region.

8. The image projection apparatus according to claim 4, wherein the image forming elements are reflective image forming elements.

9. An image projection apparatus, comprising:
a light source;
a color separating optical system which separates light from the light source into at least a first color light and a second color light;
at least two image forming elements;
a color combining optical system according to claim 5, which combines the first color light and the second color light from the image forming elements; and
a projection optical system which projects light combined by the color combining optical system.

10. The image projection apparatus according to claim 9, wherein the image forming elements are reflective image forming elements.

* * * * *